(12) United States Patent
Harris et al.

(10) Patent No.: US 10,927,979 B2
(45) Date of Patent: Feb. 23, 2021

(54) PLUMBING SUPPORT SYSTEM

(71) Applicant: 3D & L, LLC, West Plains, MO (US)

(72) Inventors: Douglas Harris, Cape Fair, MO (US); Logan Harris, Cape Fair, MO (US)

( * ) Notice: Subject to any disclaimer, the term of this patent is extended or adjusted under 35 U.S.C. 154(b) by 0 days.

(21) Appl. No.: 16/406,249

(22) Filed: May 8, 2019

(65) Prior Publication Data

US 2019/0346069 A1 Nov. 14, 2019

Related U.S. Application Data

(60) Provisional application No. 62/668,607, filed on May 8, 2018, provisional application No. 62/823,424, filed on Mar. 25, 2019.

(51) Int. Cl.
*F16L 3/08* (2006.01)
*F16L 3/12* (2006.01)

(52) U.S. Cl.
CPC .......... *F16L 3/085* (2013.01); *F16L 3/1218* (2013.01); *F16L 3/1222* (2013.01)

(58) Field of Classification Search
CPC ........ F16L 3/085; F16L 3/1218; F16L 3/1222
See application file for complete search history.

(56) References Cited

U.S. PATENT DOCUMENTS

| | | | | |
|---|---|---|---|---|
| 1,843,191 A * | 2/1932 | Balze | .................... | F16L 41/004 285/197 |
| 3,216,025 A * | 11/1965 | Roll | .......................... | E03C 1/01 4/670 |
| 3,348,312 A * | 10/1967 | Jones | .................. | E04G 21/1808 33/406 |
| 3,385,545 A * | 5/1968 | Patton | ..................... | F16L 3/222 248/68.1 |
| 5,052,722 A * | 10/1991 | Kubo | .................... | F16L 3/1222 285/136.1 |
| 5,464,256 A * | 11/1995 | Godeau | ............... | F16L 37/0885 285/26 |
| 5,836,130 A * | 11/1998 | Unruh | ..................... | F16L 3/223 52/698 |
| 6,390,421 B1 * | 5/2002 | Rudd | ...................... | F16L 3/133 248/62 |
| 10,077,902 B2 * | 9/2018 | Pestoor | .................... | F23J 13/04 |
| 2005/0244230 A1 * | 11/2005 | Doverspike | ............. | E03C 1/021 405/184.4 |
| 2018/0058610 A1 * | 3/2018 | Williams | .................. | F16L 3/22 |

* cited by examiner

*Primary Examiner* — Anita M King

(74) *Attorney, Agent, or Firm* — Kutak Rock LLP; James H. Jeffries

(57) ABSTRACT

A system for installing drain pipes and water supply lines in relation to the drain pipes is disclosed. The system includes a bracket for attachment to the drain pipe with support arms to hold water supply lines at desired locations in relation to the drain pipe. The bracket may comprise a collar for attachment to the drain pipe with indexing protrusions or shoulders to orient the bracket with respect to the drain pipe, and support arms extending outwardly from the collar to support the supply lines. The system may also include a bracket for securing the drain pipe in relation to the structure.

17 Claims, 13 Drawing Sheets

US 10,927,979 B2

PLUMBING SUPPORT SYSTEM

CROSS-REFERENCE TO RELATED APPLICATIONS

This application claims the benefit of U.S. Patent Application Ser. No. 62/668,607 filed May 8, 2018, and U.S. Patent Application Ser. No. 62/823,424 filed on Mar. 25, 2019, the disclosures of which are incorporated herein by reference.

BACKGROUND

This disclosure is in the field of systems, devices, and methods for installing plumbing fixtures.

SUMMARY OF THE INVENTION

In various embodiments, the system comprises a bracket that is attachable to a drain pipe to position and support supply lines in relation to the drain pipe. In other embodiments, the system further comprises an additional support bracket for holding the drain pipe in a desired position with respect to a structure.

DETAILED DESCRIPTION

The inventive bracket provides precise, consistent, and sturdy support to plumbing installations with quick and repeatable installation methods and results. In various embodiments the bracket 100 is designed to support cold and hot water supply lines in relationship to a drain pipe. The installation of such supply lines and drains is a commonly repeated task with the same desired configuration each time, but differences in structural support members near the installation or other unique factors in a given installation may cause extra work to be performed or less then optimal installation techniques to be used by the person installing the plumbing system.

The inventive bracket 100 provides a quick, easy method and device for installing water supply lines in relationship to a drain pipe. The bracket 100 attaches to a horizontal drain line and provides support to hot and cold water supply lines, or other pipes as may be desired. The bracket 100 may attached to a drain pipe or to a drain fitting such as a T, elbow, or other fitting attached to or made part of a drain pipe. The bracket 100 may attach to the hub or flange portion of certain types of fittings or to the outside of a pipe, socket, or sleeve as well.

Figure 1:
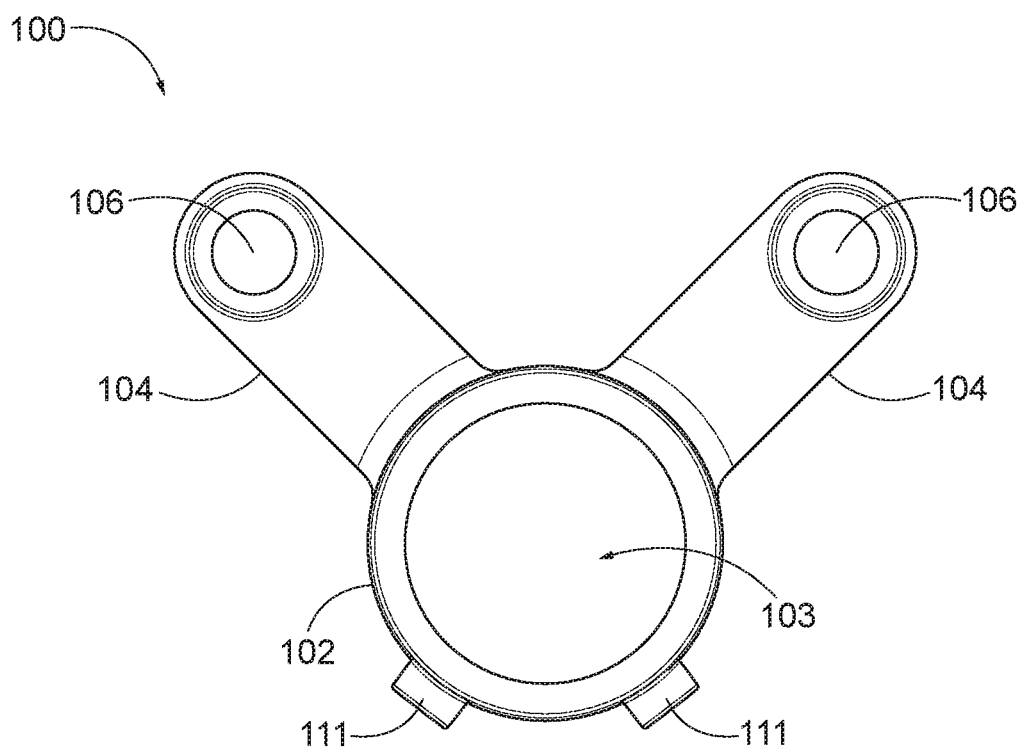
FIG. 1 is a front plan view of an embodiment of the inventive bracket.
Figure 2:
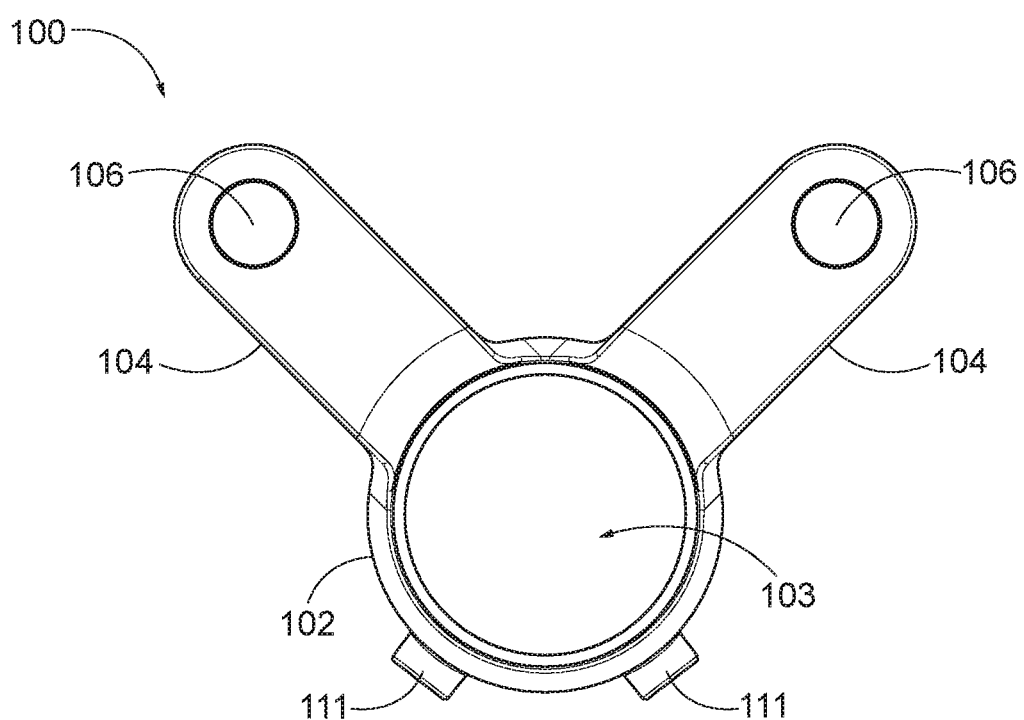
FIG. 2 is a back plan view of an embodiment of the inventive bracket.
Figure 3:
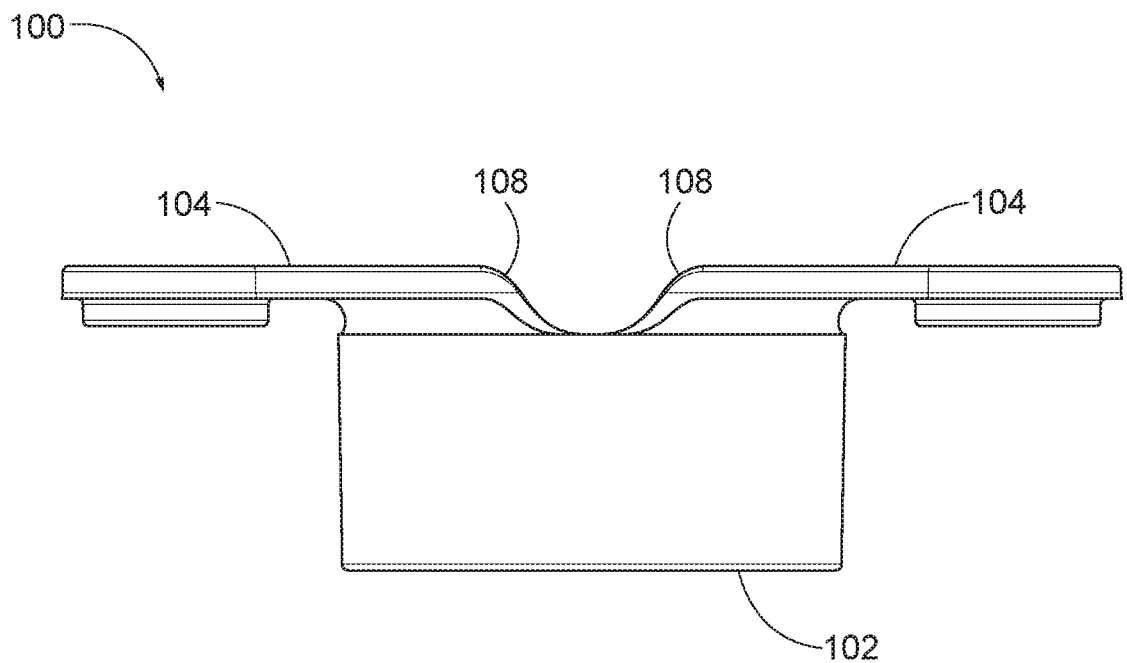
FIG. 3 is a top plan view of an embodiment of the inventive bracket.
Figure 4:
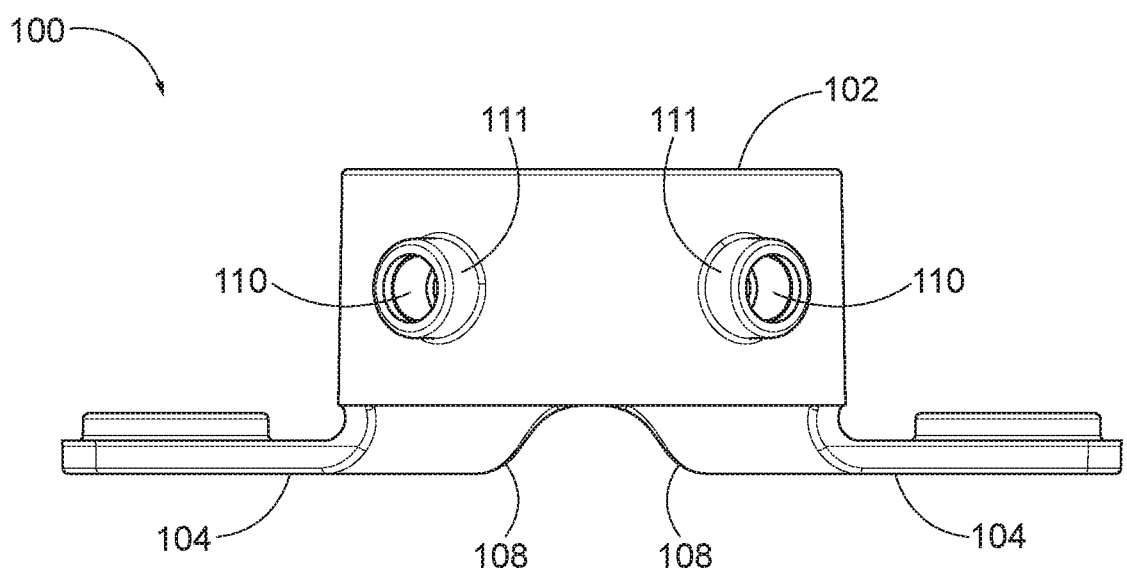
FIG. 4 is a bottom plan view of an embodiment of the inventive bracket.
Figure 5:
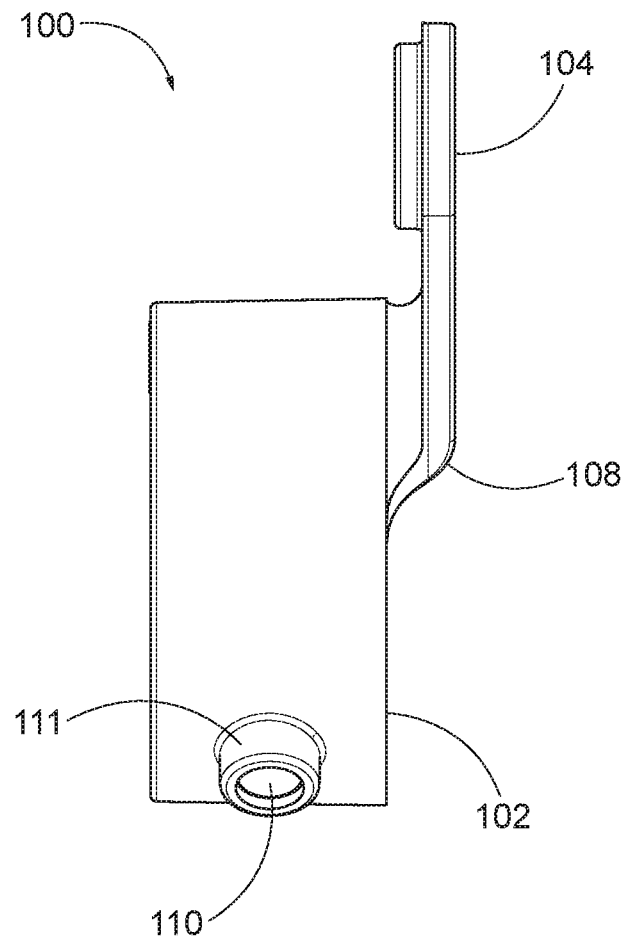
FIG. 5 is a side plan view of an embodiment of the inventive bracket.
Figure 6:
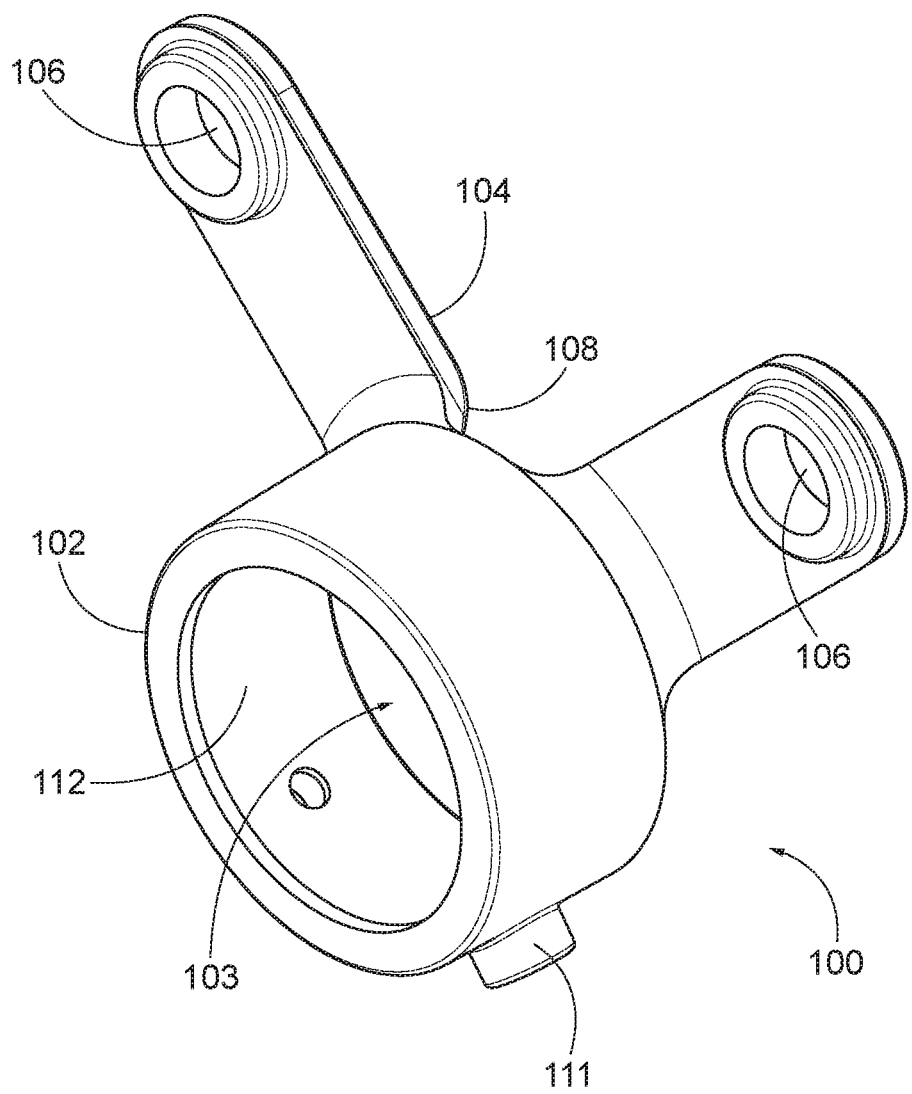
FIG. 6 is an upper perspective view of an embodiment of the inventive bracket.
Figure 7:
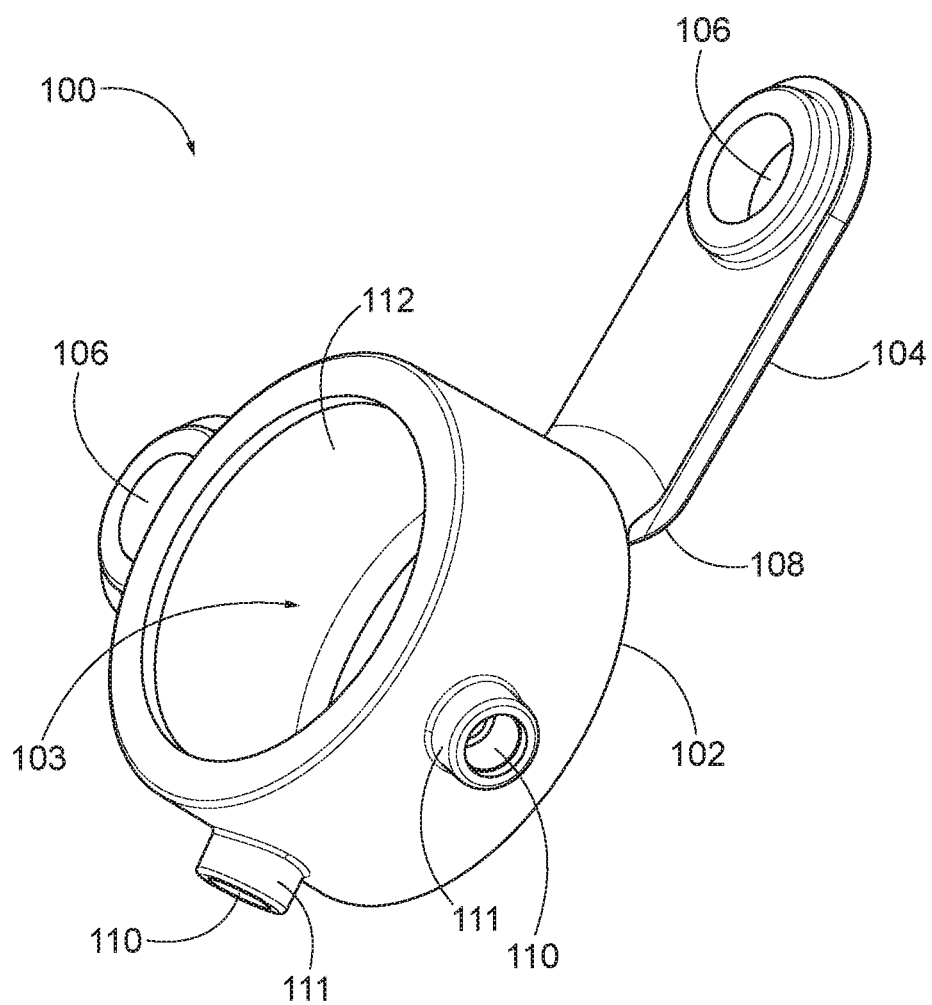
FIG. 7 is a lower perspective view of an embodiment of the inventive bracket.
Figure 8:
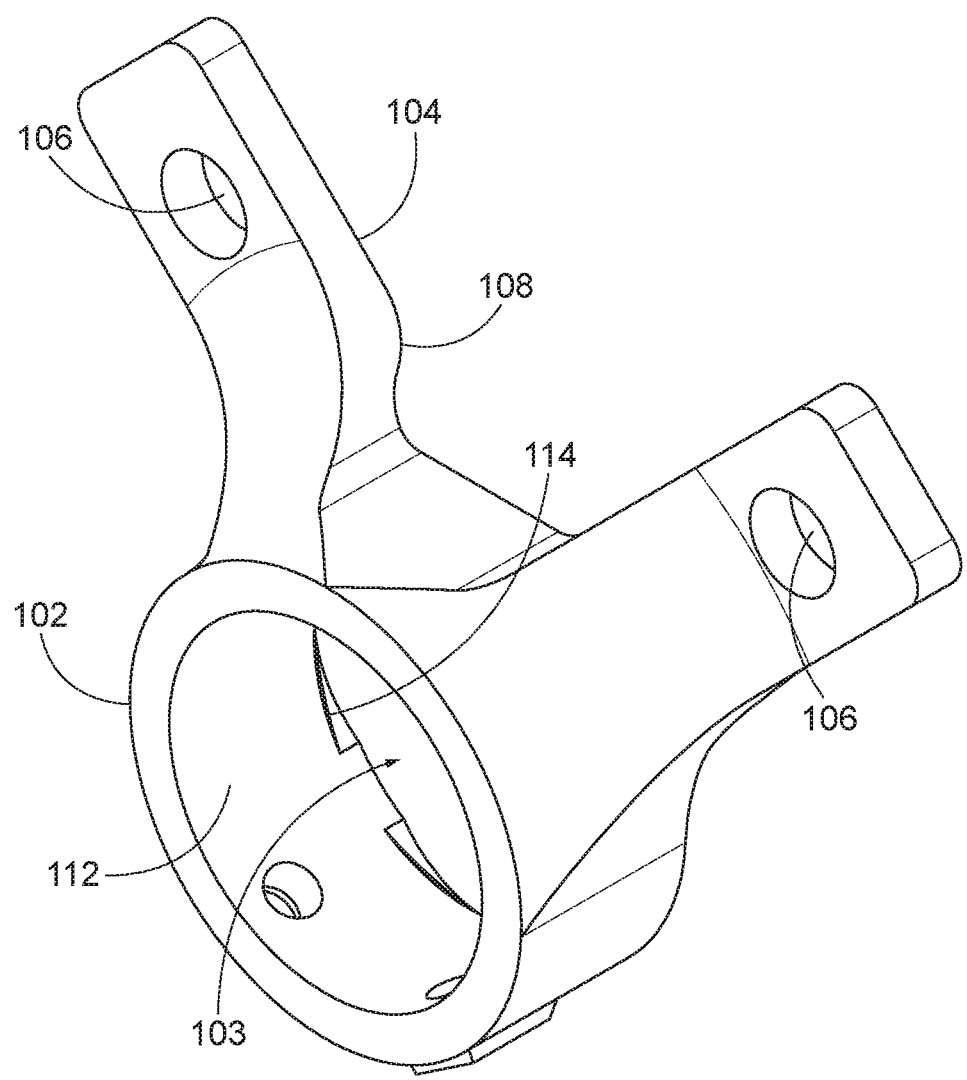
FIG. 8 is an upper perspective view of an additional embodiment of the inventive bracket.
Figure 9:
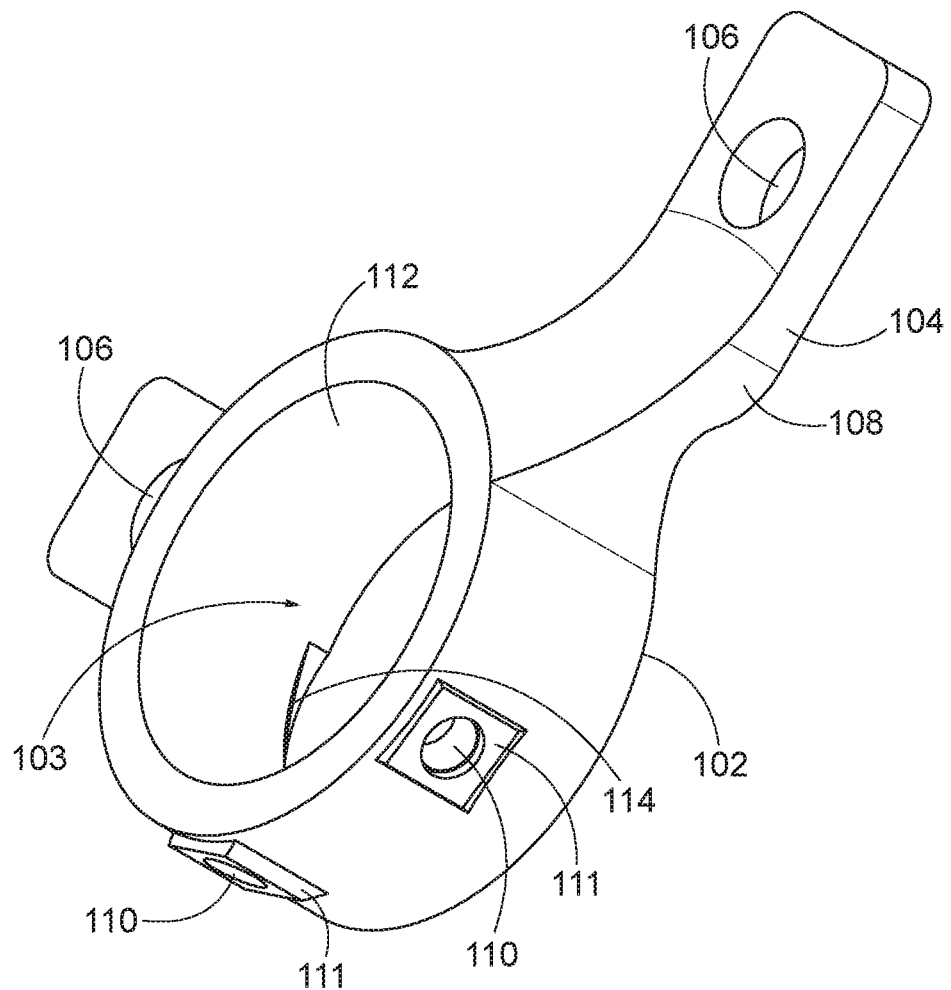
FIG. 9 is a lower perspective view of an additional embodiment of the inventive bracket.

FIGS. 1-7 depict a preferred embodiment of the inventive bracket 100. Additional embodiments, such as that depicted in FIGS. 8-9, are also within the scope of the claimed invention. Other embodiments may include additional elements such as those depicted in FIGS. 13-16.

In the depicted embodiments, the bracket 100 comprises a collar 102 that is installed on a horizontal section of drain line. The drain pipe or fitting to which the bracket 100 is to be installed is inserted into aperture 103 in collar 102 to position the bracket 100 as desired with respect to the drain pipe. The collar 102 is provided with features for securing it to the drain pipe. In the depicted embodiment, apertures 110 are provided for receiving set screws (not shown in the figures) to secure the collar 102 in relation to a drain pipe. In some embodiments of the bracket 100, such as that shown in FIGS. 1-7, a flange or support area 111 is provided all or partially around aperture 110 to provide additional support to the means of fixation such as the set screws used in the depicted embodiment. The support area may comprise a thicker section formed unitarily with the collar 102 or an additional piece attached to the collar 102.

When installed in the apertures 110 in collar 102, the set screws are tightened against the outer surface of the drain pipe on which the bracket is installed to create pressure between the set screws, the collar 102, and the drain pipe. The apertures 110 may be provided with internal threads for receiving the set screws or a sleeve with a threaded internal bore may be press fit, glued, or otherwise inserted into the aperture 110, as is clear to one of skill in the art of manufacturing such devices.

In some embodiments of the bracket 100, the internal surface 112 of the collar 102 is provided with features 114. These features 114 may be designed to make installation easier by allowing the collar 102 to slide over the drain pipe more easily, or to engage features on the outside of the drain pipe or fitting on which the bracket is installed. In the embodiment depicted in FIG. 3 the features 114 comprise scallops out of a portion of the inner surface 112 that extend only partially into the aperture 103 in collar 102.

At least one, but preferably two or more, arms 104 extend outwardly from the collar 102. The arms 104 are each provided with a feature or component for attaching a water supply or other line to the arm 104 to hold it in place in relation to the drain line. In the depicted embodiment, an aperture 106 is provided in each arm 104 at the desired location of the supply line. The apertures 106 may be provided in different sizes to allow various sizes of supply lines, or fittings for supply lines to be inserted into the aperture 106. In some embodiments, holes may be provided adjacent to the aperture 106 to allow a supply line fitting to be attached to the bracket 100 using bolts, screws, or other means of attachment. In other embodiments, a fitting may be incorporated into the arm 104, such as a barbed insert for attaching a supply line to the bracket, or an elbow or other fitting connected to or incorporated into arm 104. In the depicted embodiment, the arms 104 are offset to the back of the collar 102, but in other embodiments the arms 104 may extend directly out of the collar 102 without the rear offset.

In some embodiments, one or more of the arms 104 is provided with a shoulder 108 that extends outwardly from arm 104. In other embodiments, the shoulder 108 may comprise a separate protrusion that is not part of arm 104. The shoulder or protrusion 108 is disposed to contact a part of the drain line to orient the bracket 100 in a desired orientation with respect to the drain line. In the depicted embodiment, the opposed shoulders 108 on the two arms 104 contact a portion of the drain pipe as depicted in FIG. 9 to orient the arms to either side of the vertical portion of the drain pipe. In other embodiments the arms 104 may be designed with a different configuration with respect to the protrusions 108 as desired for a specific type of installation.

The embodiment shown in FIGS. 1-7 includes an optional flange on the front edge of aperture 103 in collar 102. This flange provides a stop function to prevent over insertion of the collar 102 on to the drain pipe component 116. This flange is not present in all embodiments.

Referring now to FIGS. 8 and 9, perspective views of an additional embodiment of the bracket 100 are depicted. This embodiment incorporates scalloped features 114 to provide additional engagement between the bracket and the drain pipe on which it is installed to prevent rotation of the bracket on the pipe, among other uses.

Figure 10:
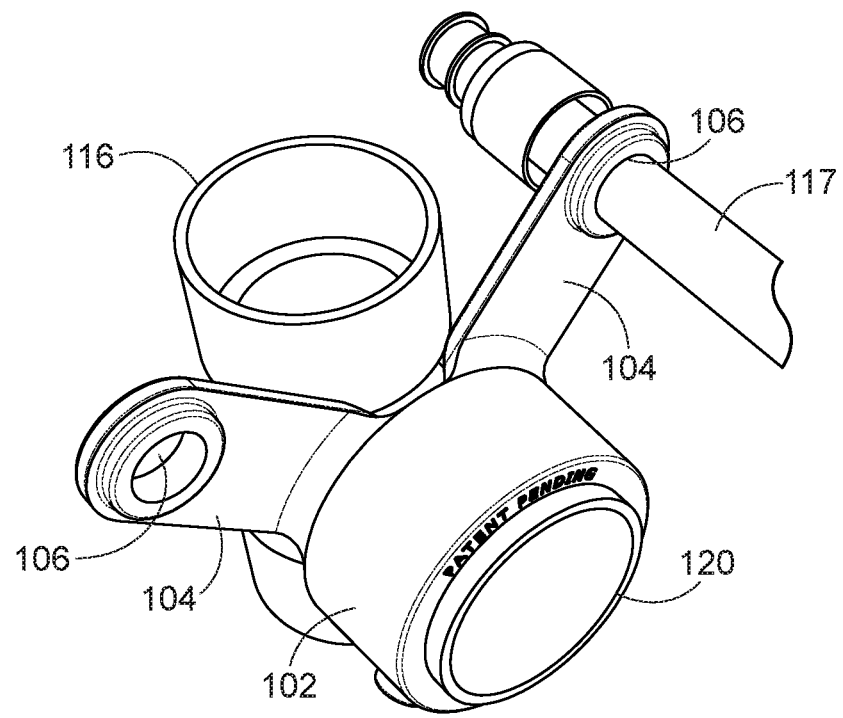
FIG. 10 is a perspective view of an embodiment of the inventive bracket installed on a drain pipe.
Figure 11:
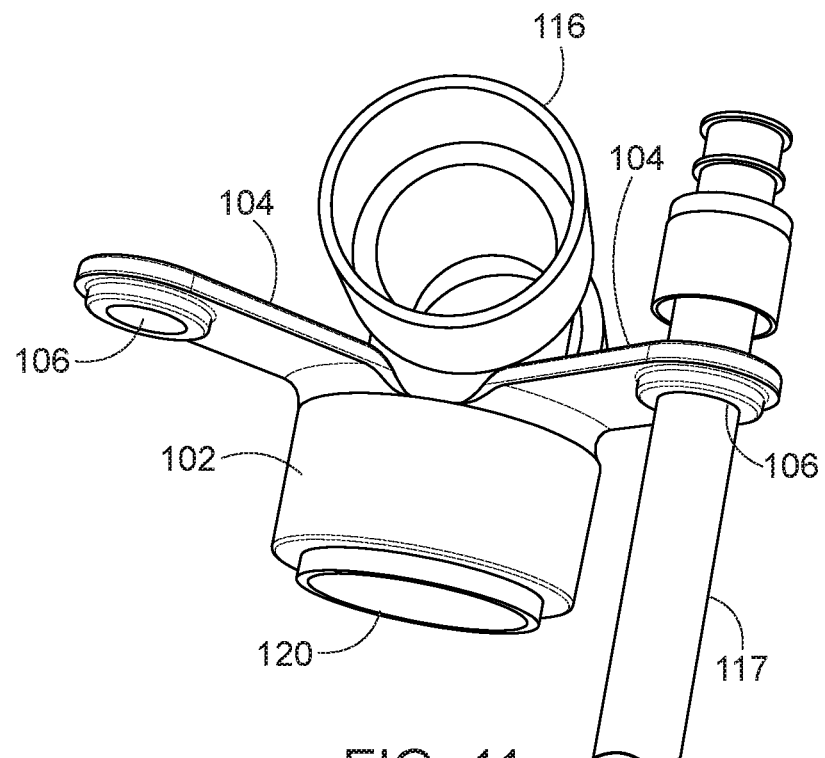
FIG. 11 is a perspective view of an embodiment of the inventive bracket installed on a drain pipe.

Referring now to FIGS. 10 and 11, perspective views of an embodiment of the inventive bracket installed on a drain pipe component 116 are depicted. In this depiction, the inventive bracket is installed on a Tee joint pipe fitting as an example installation. Each end of the tee joint fitting has a hub connector portion for receiving a section of drain pipe. In the depicted installation, the aperture 103 in collar 102 is disposed over the horizontal hub connector portion of the tee joint fitting. In this installation, the horizontal portion 120 of the drain pipe component 116 is inserted into collar 102, and secured there by set screws or other similar fixation devices, in apertures 110. The protrusions or shoulders formed at the point of attachment of the arms 104 to collar 102 may be disposed against the vertical portion of the tee joint fitting to align the arms with respect to the vertical portion of the drain pipe. If both shoulders contact the vertical portion of the fitting or pipe, then the water line apertures will be equidistant from the vertical and horizontal portions of the fitting, so long as arms 104 are of equal length.

Apertures 110 are shown on the bottom of the collar 102, but in some embodiments they may be on the bottom, side, top or several portions of the collar 102. Once the bracket 100 is at the desired position, a set screw may be screwed into the set screw aperture until the end of the set screw presses against the outer surface of the tee joint fitting, thus holding the bracket 100 in place with respect to the fitting 116.

A water supply line 117 is shown installed in aperture 106 of arm 104. In a typical installation water supply lines would be installed in both apertures 106 of arms 104, one hot and one cold. One or both of the shoulders 108 of the bracket 100 may be in contact with the vertical portion of drain pipe component 116 to align the arms 104 in a desired orientation to the drain pipe component 116.

Figure 12:
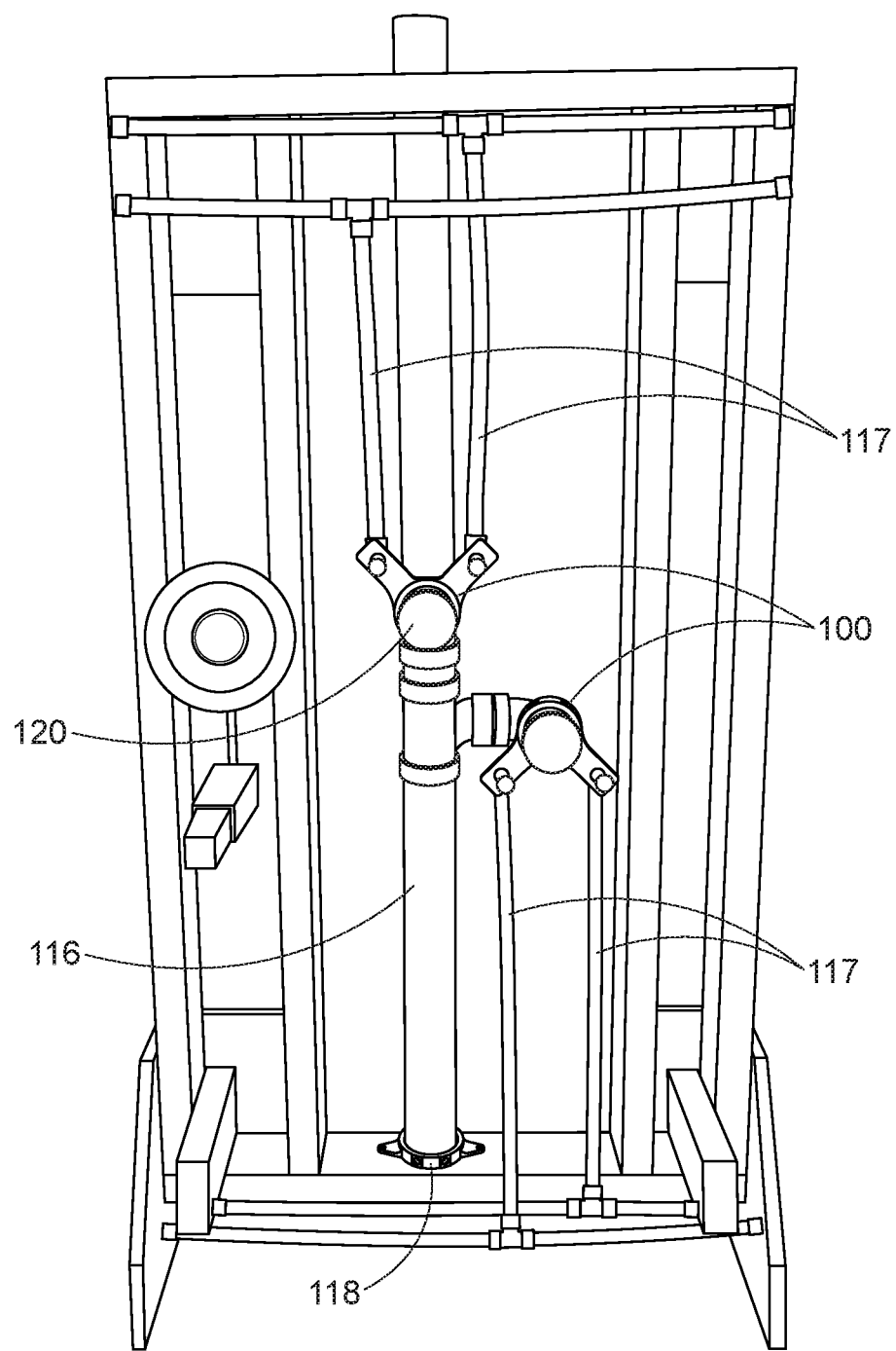
FIG. 12 is a view of various embodiments of the inventive bracket installed in a plumbing installation.
Figure 13:
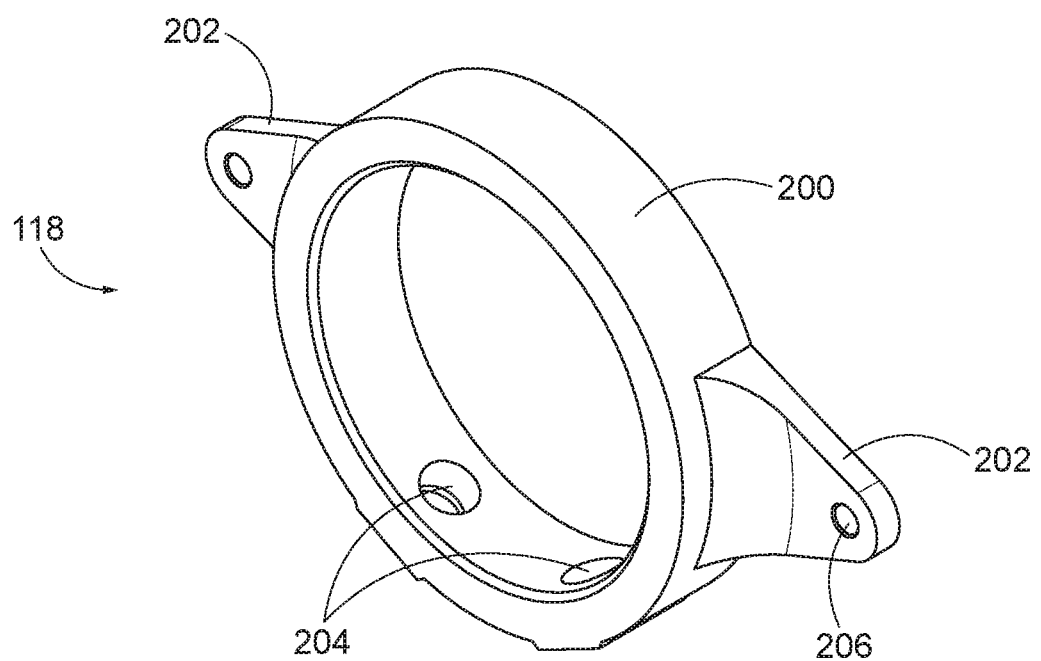
FIG. 13 is a perspective view of an additional element of an embodiment the inventive bracket.
Figure 14:
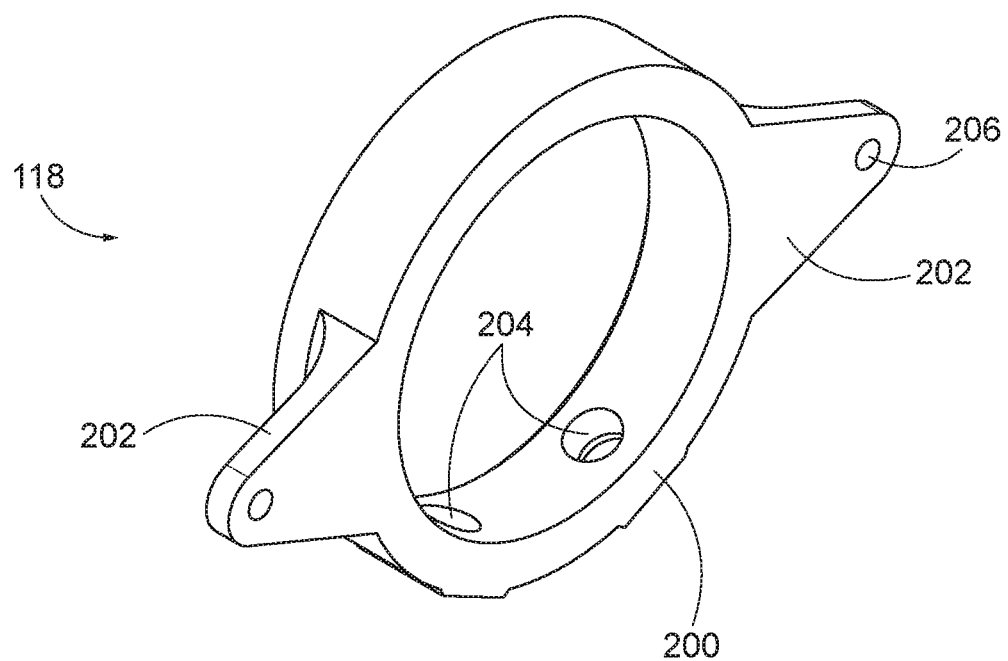
FIG. 14 is a perspective view of an additional element of an embodiment of the inventive bracket.
Figure 15:
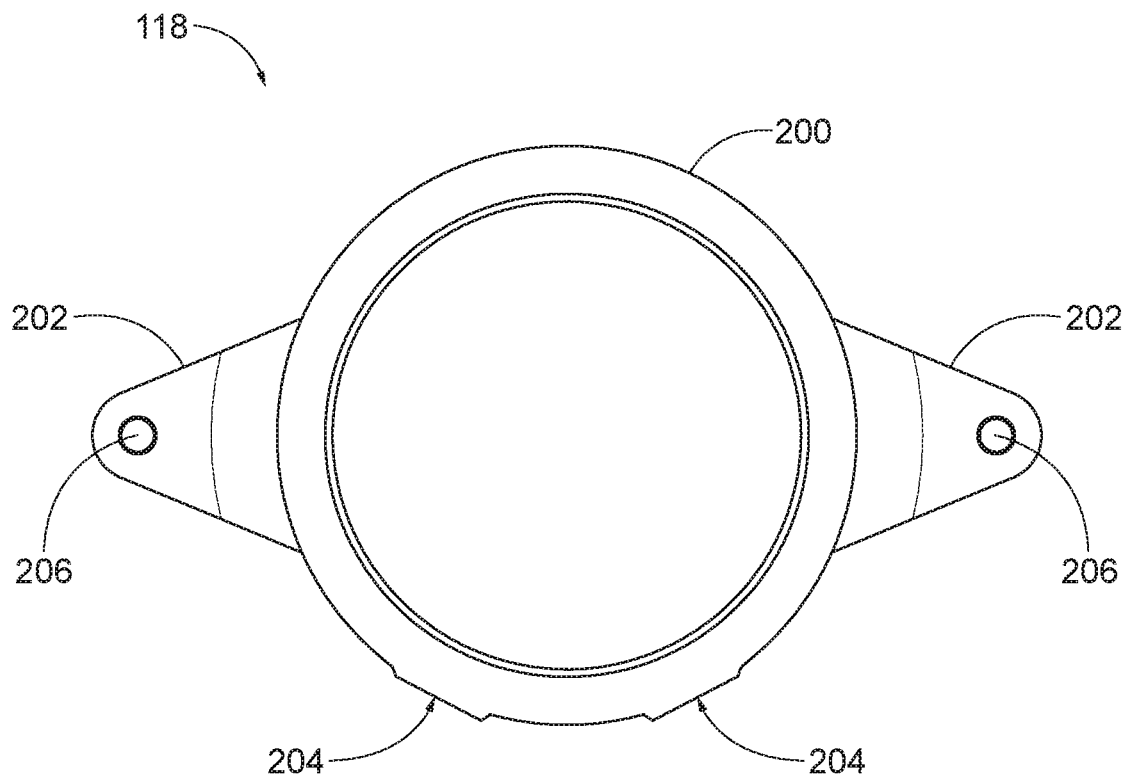
FIG. 15 is a front plan view of an additional element of an embodiment of the inventive bracket.
Figure 16:
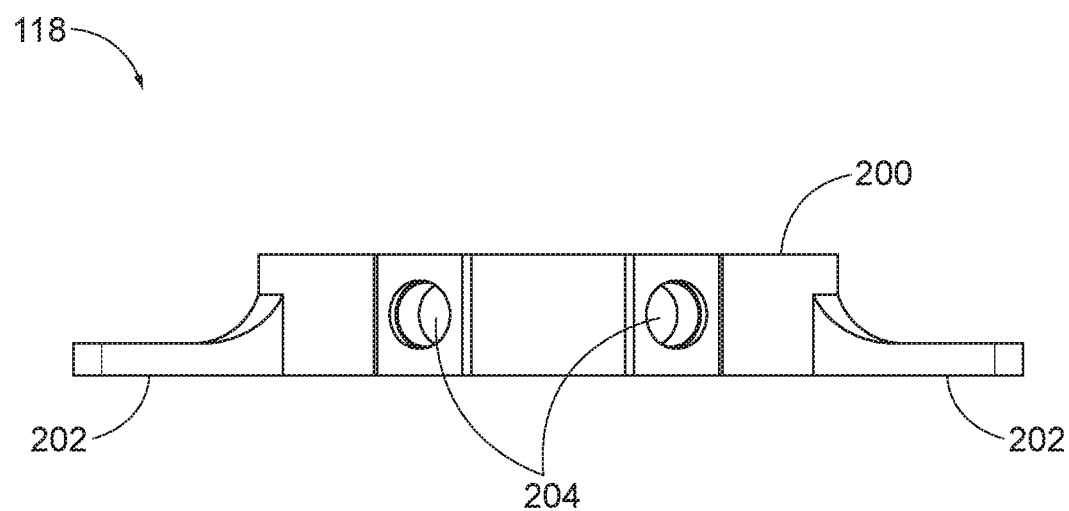
FIG. 16 is a bottom plan view of an additional element of an embodiment of the inventive bracket.

Referring now to FIG. 12, the bracket 100 is shown as installed as part of a system of installation of plumbing. Two different brackets 100 are shown attached to drain pipes 116 at horizontal drain 120. The bracket 100 attached to drain pipe 120 is installed with the arms extending upwardly and to the sides of the drain pipe 116. The other is shown with the arms extending downwardly from the horizontal extension of the drain pipe 116. The bracket 100 might also be installed extending to the sides of the drain pipe 116 with one arm above the other, if that is a desired configuration. Any other rotational position of the bracket 100 could be used so long as the supply lines did not interfere with the drain pipe at that position.

An additional bracket 118 may also be used in conjunction with the bracket 100. The bracket 118 is provided with a collar with an aperture for a drain pipe 116. The bracket 118 is provided with one or more arms or similar features to allow it to be attached to a structure such as a floor, the bottom plate of a stud wall or a stud. In the depicted embodiment, a plurality of arms extend outwardly from the collar of bracket 118 with a hole for a screw to affix the bracket 118 to the floor or bottom plate. The collar of bracket 118 is provided with one or more feature for securing the bracket 118 at a desired location on the drain pipe 116 (or vice versa). This bracket allows a vertical drain pipe 116 to be secured to and held at a desired vertical position during installation. It also provides additional support during the life of the plumbing system.

The bracket 100 may be used in conjunction with bracket 118 to quickly and precisely install a drain and supply lines for a sink or similar plumbing fixture. A user of the system, first disposes a bracket 118 onto the vertical drain pipe when it is installed. The user attaches the bracket 118 to the structure, positions the pipe at the desired height, and then attaches the bracket 118 to the drain pipe. This fixes the vertical position of the drain pipe to allow the user to install other components of the drain pipe including the bracket 100 at the desired height above the structure of the floor.

Referring now to FIGS. 13-16, perspective and plan views are shown of an embodiment of the additional bracket 118. The depicted embodiment of the bracket 118 has a collar 200, and at least two arms 202 with holes 206 disposed therein. Screws or other similar fasteners may be inserted through holes 206 to affix the bracket 118 to a surface at a desired location. The fastener may be a nail, screw, clip or other similar fastening device. In some embodiments, construction glue or a similar adhesive may be used to affix the bracket 118 to the structure. Typically the bracket 118 will be installed with the large aperture in 118 disposed over a hole cut into a floor or similar surface for a drain pipe.

In some embodiments, the collar 200 is provided with apertures 204 similar to apertures 110, for receiving means of securing the collar 200 to the drain pipe 116. In a preferred embodiment, the means of securing the collar are set screws or similar pressure/friction based means of securing one component to another.

In various embodiments, the bracket 118 may be used by first affixing it to a structural component of a building at a desired location for a drain pipe. For example, this might be disposed over a hole cut in a subfloor or stud plate of a wall intended to receive a vertical drain pipe 116. The bracket may be placed in the desired location and attached to the structure before the pipe, or placed over a pipe that is in its desired location and then attached to the structure. Similarly, the bracket 118 may be secured to the pipe first and then the structure, or vice versa. The fixation of the bracket 118 to both the structure and the pipe 116 prevents the pipe 118 from moving in an undesired manner as additional components, such as a T joint and a bracket 100, are installed on the pipe 118. This allows a pipe 116 to be fixed such that the T joint and bracket 100 will be at the desired height above a floor, and prevents later shifting of the components away from the desired position.

Changes may be made in the above methods, devices and structures without departing from the scope hereof. Many different arrangements of the various components depicted, as well as components not shown, are possible without departing from the spirit and scope of the present invention. Embodiments of the present invention have been described with the intent to be illustrative and exemplary of the invention, rather than restrictive or limiting of the scope thereof. Alternative embodiments will become apparent to those skilled in the art that do not depart from its scope. Specific structural and functional details disclosed herein are not to be interpreted as limiting, but merely as a representative basis for teaching one of skill in the art to employ the present invention in any appropriately detailed structure. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A plumbing support system for supporting at least one water line in relation to a drain pipe, the plumbing support system comprising:
    a bracket having a collar having an aperture for receiving a horizontal portion of the drain pipe, the collar having at least one aperture for receiving a set screw for securing the collar to the horizontal portion of the drain pipe;
    at least one arm affixed to the collar at a first end thereof, and extending outwardly from the collar, the at least one arm having an aperture therein for receiving one of the at least one water lines;
    at least one protrusion extending from the collar for engaging the drain pipe to orient the bracket in relation to the drain pipe; and
    wherein the at least one protrusion comprises a shoulder formed where one of the at least one arm connects to the collar.

2. The plumbing support system of claim 1 wherein the aperture in the at least one arm is positioned to support the at least one water line in a desired position with respect to the drain pipe.

3. The plumbing support system of claim 2 wherein the desired position of the water line is substantially parallel to the horizontal portion of the drain pipe.

4. The plumbing support system of claim 1 further comprising a flange on a first end of the collar.

5. The plumbing support system of claim 1 wherein the drain pipe partially comprises a tee joint fitting, and the aperture in the collar is disposed over a horizontal hub connector portion of the tee joint fitting.

6. The plumbing support system of claim 1 further comprising a second bracket for securing the drain pipe to a structure, the second bracket comprising:
    a collar having an aperture for receiving a vertical portion of the drain pipe, the collar having at least one aperture for receiving a set screw for securing the collar to the vertical portion of the drain pipe; and
    at least one arm affixed to the collar and extending outwardly from the collar, the at least one arm having a hole therein for affixing the second bracket to the structure.

7. A plumbing support system for supporting at least one water line in relation to a drain pipe, and the drain pipe in relation to a structure, the plumbing support system comprising:
    a first bracket comprising a collar and at least one arm extending outwardly from the collar;
    wherein the collar of the first bracket has an aperture for receiving a horizontal portion of the drain pipe, and at least one set screw aperture for receiving a set screw to secure the first bracket to the drain pipe;
    wherein each arm of the at least one arm of the first bracket has an aperture for receiving one of the at least one water line;
    wherein each arm of the at least one arm of the first bracket forms a shoulder at the point of attachment to the collar;
    a second bracket comprising a collar and at least one arm extending outwardly from the collar;
    wherein the collar of the first bracket has an aperture for receiving a vertical portion of the drain pipe, and at least one set screw aperture for receiving a set screw to secure the second bracket to the drain pipe.

8. The plumbing support system of claim 7 wherein the horizontal portion of the drain pipe comprises the horizontal hub connector portion of a tee joint fitting.

9. A method of using the plumbing support system of claim 8, the method comprising the steps of:
    disposing the aperture of the second bracket over the vertical portion of the drain pipe;
    securing at least one set screw in the at least one set screw aperture in the second bracket to secure the second bracket at a desired position with respect to the drain pipe;
    securing the second bracket to the structure by connecting a fastener to the structure through a hole in the at least one arm to support the drain pipe in relation to the structure;
    disposing the aperture of the first bracket over the horizontal hub portion of the tee joint fitting so that the vertical portion of the tee joint contacts a shoulder of at least one of the arms of the first bracket;
    securing at least one set screw in the at least one set screw aperture in the first bracket to secure the first bracket at a desired position with respect to the drain pipe;
    inserting a water line in the aperture in one of the at least one arms of the first bracket to secure the water line in relation to the drain pipe.

10. A plumbing support bracket for supporting at least one line in relation to a drain pipe having a horizontal portion, the plumbing support bracket comprising:
    a bracket having a collar for receiving the horizontal portion of the drain pipe;
    at least one arm affixed to the collar at a first end of the at least one arm, and extending outwardly from the collar, the at least one arm having an aperture therein for receiving a line;
    wherein a shoulder is formed at an attachment of the at least one arm to the collar.

11. The plumbing support bracket of claim 10 wherein the shoulder disposes the arm at an offset to an edge of the collar.

12. The plumbing support bracket of claim 10 wherein a front surface of the at least one arm is offset from a back edge of the collar.

13. The plumbing support bracket of claim 10 further comprising a flange on a first end of the collar.

14. The plumbing support bracket of claim 13 wherein the at least one arm is offset from a second end of the collar disposed at the opposite end of the collar from the first end of the collar.

15. The plumbing support bracket of claim 10 wherein the at least one arm comprises a first arm and a second arm, the first arm and the second arm extending radially outward from the collar in different directions.

16. The plumbing support bracket of claim 15 wherein a first line received in the first arm is disposed on an opposite side of a vertical portion of the drain pipe to a second line received in the second arm.

17. The plumbing support system of claim 10 wherein the shoulder comprises a protrusion extending from the collar to hold each of the at least one arm.

* * * * *